US011143935B2

(12) United States Patent
Imai et al.

(10) Patent No.: US 11,143,935 B2
(45) Date of Patent: Oct. 12, 2021

(54) BLADE OPERATING DEVICE AND BLADE OPERATING METHOD

(71) Applicant: Nidec Copal Corporation, Tokyo (JP)

(72) Inventors: Kenzo Imai, Tokyo (JP); Nobuaki Watanabe, Tokyo (JP); Daisuke Kakemizu, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/699,426

(22) Filed: Nov. 29, 2019

(65) Prior Publication Data
US 2020/0174340 A1 Jun. 4, 2020

(30) Foreign Application Priority Data

Nov. 30, 2018 (JP) .............................. JP2018-225182

(51) Int. Cl.
*G03B 9/26* (2021.01)
*H04M 1/02* (2006.01)
*G03B 11/04* (2021.01)

(52) U.S. Cl.
CPC .............. *G03B 9/26* (2013.01); *G03B 11/043* (2013.01); *H04M 1/0264* (2013.01)

(58) Field of Classification Search
CPC combination set(s) only.
See application file for complete search history.

(56) References Cited

U.S. PATENT DOCUMENTS

| 6,464,411 | B1 | 10/2002 | Yoshida et al. | |
| 2004/0165108 | A1* | 8/2004 | Okuda | G03B 17/02 348/375 |
| 2004/0198477 | A1* | 10/2004 | Jung | H04M 1/0245 455/575.4 |
| 2007/0122144 | A1* | 5/2007 | Han | H04N 5/2251 396/448 |
| 2007/0193901 | A1* | 8/2007 | Cohen | A45C 11/38 206/316.2 |
| 2011/0001872 | A1* | 1/2011 | Honsho | G02B 3/00 348/362 |
| 2013/0170037 | A1* | 7/2013 | Iizuka | G03B 11/04 359/511 |
| 2016/0241748 | A1* | 8/2016 | Chang | G01N 15/1434 |
| 2018/0234637 | A1* | 8/2018 | Marino | H04N 21/43635 |

FOREIGN PATENT DOCUMENTS

| JP | 2000-111989 A | 4/2000 | |
| JP | 2001-91993 A | 4/2001 | |
| JP | 2001-356387 A | 12/2001 | |
| JP | 2007-271989 A | 10/2007 | |
| JP | 3170619 U | 9/2011 | |
| JP | 2014-167559 A | 9/2014 | |
| KR | 2007074185 A | * 7/2007 | ............... H04B 1/40 |

* cited by examiner

*Primary Examiner* — Junpeng Chen
(74) *Attorney, Agent, or Firm* — Hauptman Ham, LLP

(57) ABSTRACT

A technique prevents leakage of private images and/or images unintended by a user from an imaging device connected to a network, without a troublesome manual operation of opening and closing a cover. A blade operating device includes a blade that opens and closes an optical path of an imaging device connectable to a network, a blade driver that opens and closes the blade, and a controller that controls the blade driver. The controller controls the blade driver to close the blade when the imaging device is turned off.

17 Claims, 8 Drawing Sheets

BLADE OPERATING DEVICE AND BLADE OPERATING METHOD

RELATED APPLICATIONS

The present application claims priority to Japanese Patent Application Number 2018-225182, filed Nov. 30, 2018, the disclosure of which is hereby incorporated by reference herein in its entirety.

BACKGROUND

Technical Field

The present invention relates to a blade operating device that opens and closes a blade for opening and closing an optical path of an imaging device (camera), and a blade operating method.

Description of the Background

Information communication terminals used widely for personal use commonly incorporate an imaging device. Images captured by such an imaging device are stored in the user's information communication terminal and are also transmitted, through a network to which the information communication terminal is connected, to an information communication terminal of another user or to various servers. Information communication terminals are used particularly in internet phone calls or videoconferences that involve transmission and reception of images (videos) in addition to voice, and thus unavoidably incorporate an imaging device (refer to, for example, Patent Literature 1 described below). Surveillance cameras are also widely installed in houses and offices. A surveillance camera transmits, through a network, captured images to a user's information communication terminal or to a server owned by, for example, a security company.

An imaging device connected to a network may be operated by a hacked or cracked information communication terminal or server, creating an insecure state of images unintended by a user being obtained by a third party through the network. In response to this, an imaging device including a slidable cover, which is a sheet, a blade, or a plate, in front of a shooting hole has been developed (refer to, for example, Patent Literatures 1 and 2 described below). The cover closes the shooting hole when the imaging device is not in use.

CITATION LIST

Patent Literature

Patent Literature 1: Japanese Unexamined Patent Application Publication No. 2014-167559
Patent Literature 2: Japanese Utility Model Registration No. 3170619

BRIEF SUMMARY

The technique described above involves a troublesome manual operation of sliding the cover to close the shooting hole. The user may forget to place the cover, failing to prevent images unintended by the user from being obtained or from snooping through a network. The user may forget to open the cover when the imaging device is turned on, disabling the normal surveillance function.

One or more aspects of the present invention are directed to a technique for preventing leakage of private images and/or images unintended by a user from an imaging device connected to a network, without a troublesome manual operation of opening and closing a cover.

In response to the above issue, the device according to one or more aspects of the present invention has the structure described below.

A blade operating device includes a blade that opens and closes an optical path of an imaging device connectable to a network, a blade driver that opens and closes the blade, and a controller that controls the blade driver. The controller controls the blade driver to close the blade when the imaging device is turned off.

A blade operating method is for opening and closing a blade for opening and closing an optical path of an imaging device connectable to a network. The method includes closing the blade when the imaging device is turned off.

DETAILED DESCRIPTION

Figure 1:
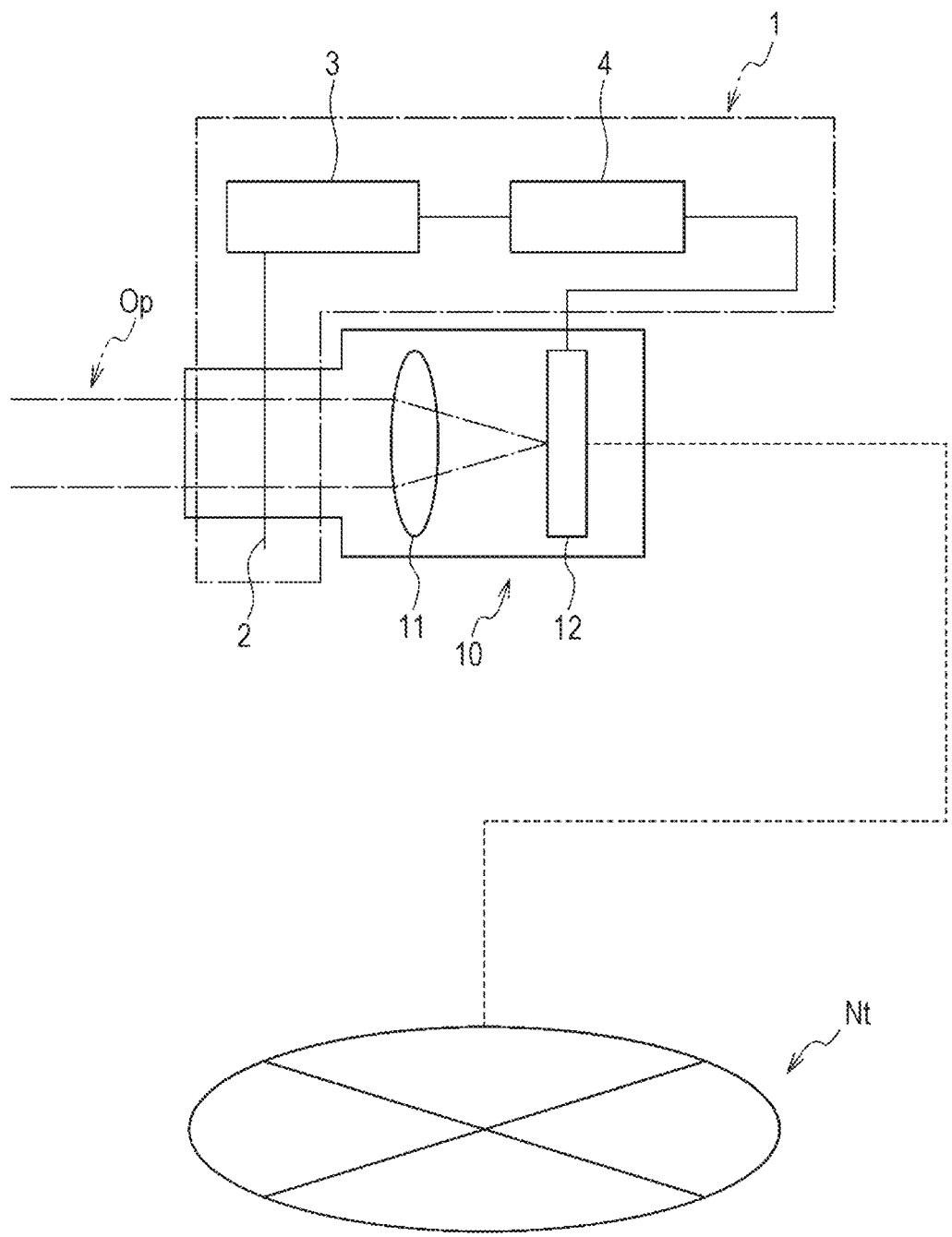
FIG. 1 is a diagram describing the structure of a blade operating device according to one or more embodiments of the present invention.

Embodiments of the present invention will now be described with reference to the drawings. Hereafter, the components with the same function in different figures are given the same reference numerals, and will not be described repeatedly.

As shown in FIG. 1, a blade operating device 1 includes a blade 2 that opens and closes an optical path Op of an imaging device 10 connectable to a network Nt, a blade driver 3 that opens and closes the blade 2, and a controller 4 that controls the blade driver 3. The imaging device 10 includes a lens unit 11 and an image sensor 12. The lens unit 11 focuses light onto an imaging surface of the image sensor 12 to form the optical path Op. The imaging device 10 may be directly connected to the network Nt, or an information communication terminal (not shown) including the imaging device 10 may be connected to the network Nt.

Figure 2:
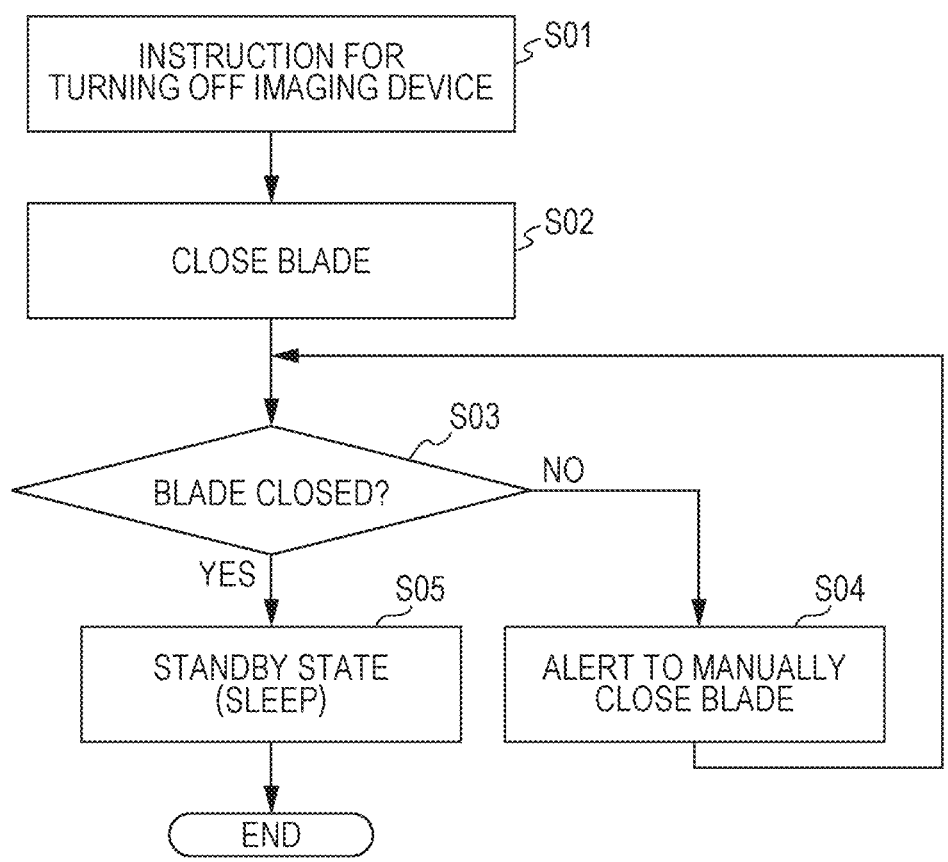
FIG. 2 is a flowchart showing an example operation of a controller (blade operation).
Figure 3:
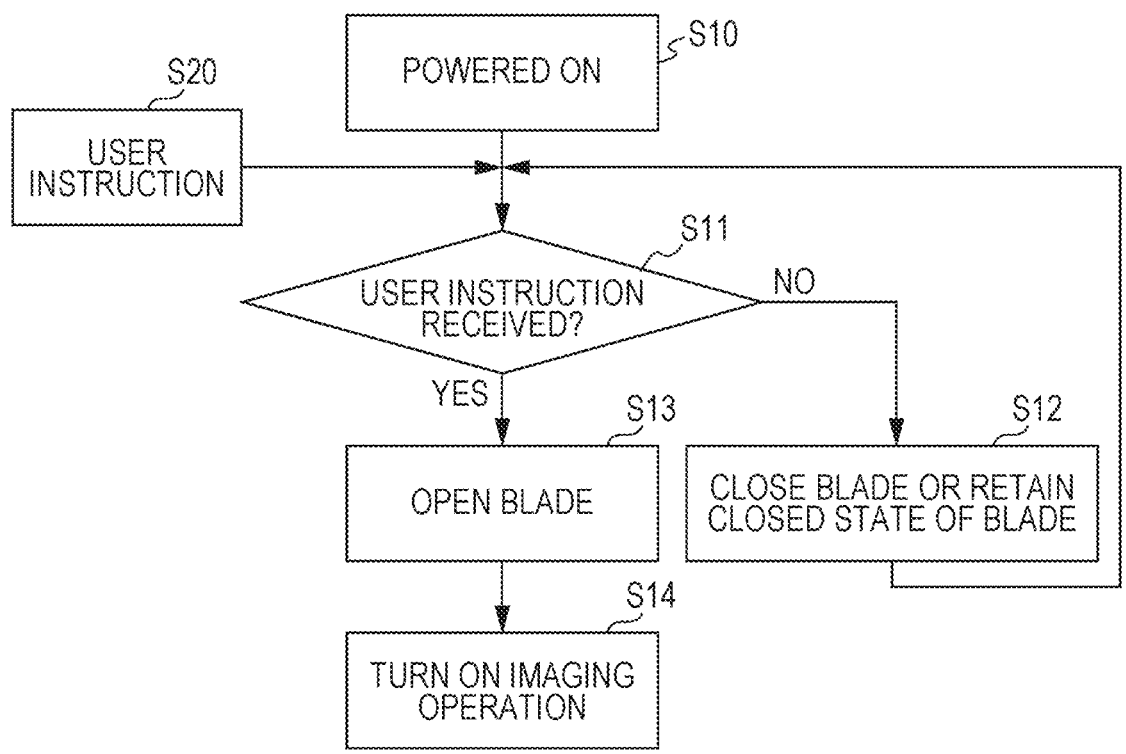
FIG. 3 is a flowchart showing an example operation of a controller (blade operation).

FIGS. 2 and 3 each show an example operation of the controller 4. The controller 4 controls the blade driver 3 to close the blade 2 when the imaging device 10 is turned off. The controller 4 also controls the blade driver 3 to open the blade 2 in response to a signal generated in accordance with an instruction from a user.

More specifically, as shown in FIG. 2, in response to an instruction for turning off the imaging device 10 (S01), the controller 4 outputs a control signal to the blade driver 3 to close the blade 2 (S02). The controller 4 determines whether the blade 2 has actually closed the optical path Op by, for example, detecting the amount of light received by the image sensor 12 (S03). When determining that the blade 2 has closed the optical path Op (YES in S03), the controller 4 enters a standby state (sleep) (S05). In contrast, when determining that the blade is not closed after the blade closing control (NO in S03), the controller 4 outputs an alert (e.g., with a display or a sound) prompting to manually close the blade 2 (S04). The controller 4 then again determines whether the blade is closed (S03). When determining that the blade is closed (YES in S03), the controller 4 enters a standby state (S05).

In another embodiment, an alert prompting to manually close the blade may be output when the blade is not closed after a predetermined number of blade closing instructions are provided. More specifically, in step S03, the controller 4 may determine that the blade is not closed (NO) when failing to detect a closed state of the blade after the predetermined number of blade closing instructions are provided, and advance to step S4.

As shown in FIG. 3, when the device is powered on (S10), the controller 4 constantly determines whether a user instruction for operating the imaging device 10 is received (S11). When receiving no such user instruction (NO in S11), the controller 4 closes the blade 2 or retains a closed state of the blade 2 (S12) and waits for a user instruction. In response to a user instruction (S20), the controller 4 determines that the user instruction is received (YES in SI 1), and outputs a signal for opening the blade 2 (S13) to turn on the imaging operation (S14).

In another embodiment, after turning on the imaging operation with the imaging device 10 in step S14, the controller 4 may determine whether the blade is open. In determining whether the blade is open based on the amount of light received by the image sensor 12, the controller 4 may determine that the blade is closed when the amount of light is less than a predetermined amount, and again provide an instruction for opening the blade. When the amount of light is at least the predetermined amount, the controller 4 determines that the blade is open. However, some light may be received through the closed blade to cause the amount of light to be at least the predetermined amount. The controller 4 may thus again provide an instruction for opening the blade although the amount of light is at least the predetermined amount. When the blade does not enter an open state after a predetermined number of instructions for opening the blade are provided, the controller 4 may notify the user of the blade being closed.

With the operation described above, the blade 2 closes the optical path Op automatically or manually in a reliable manner when the imaging operation with the imaging device 10 is turned off. When the device is powered on, the blade 2 will not open the optical path Op before receiving a user instruction. The optical path Op remains constantly closed by the blade 2 if the image sensor 12 is turned on in an unauthorized manner by, for example, cracking to prevent leakage of private images and/or images unintended by the user from the imaging device 10 through the network Nt.

In the present embodiment, the imaging operation being turned off includes a state in which the user stops capturing images, in addition to a state in which the imaging device 10 (image sensor 12) is powered off. The imaging operation being turned on includes a state in which the user starts capturing images, in addition to a state in which the imaging device 10 (image sensor 12) is powered on.

Figure 4:
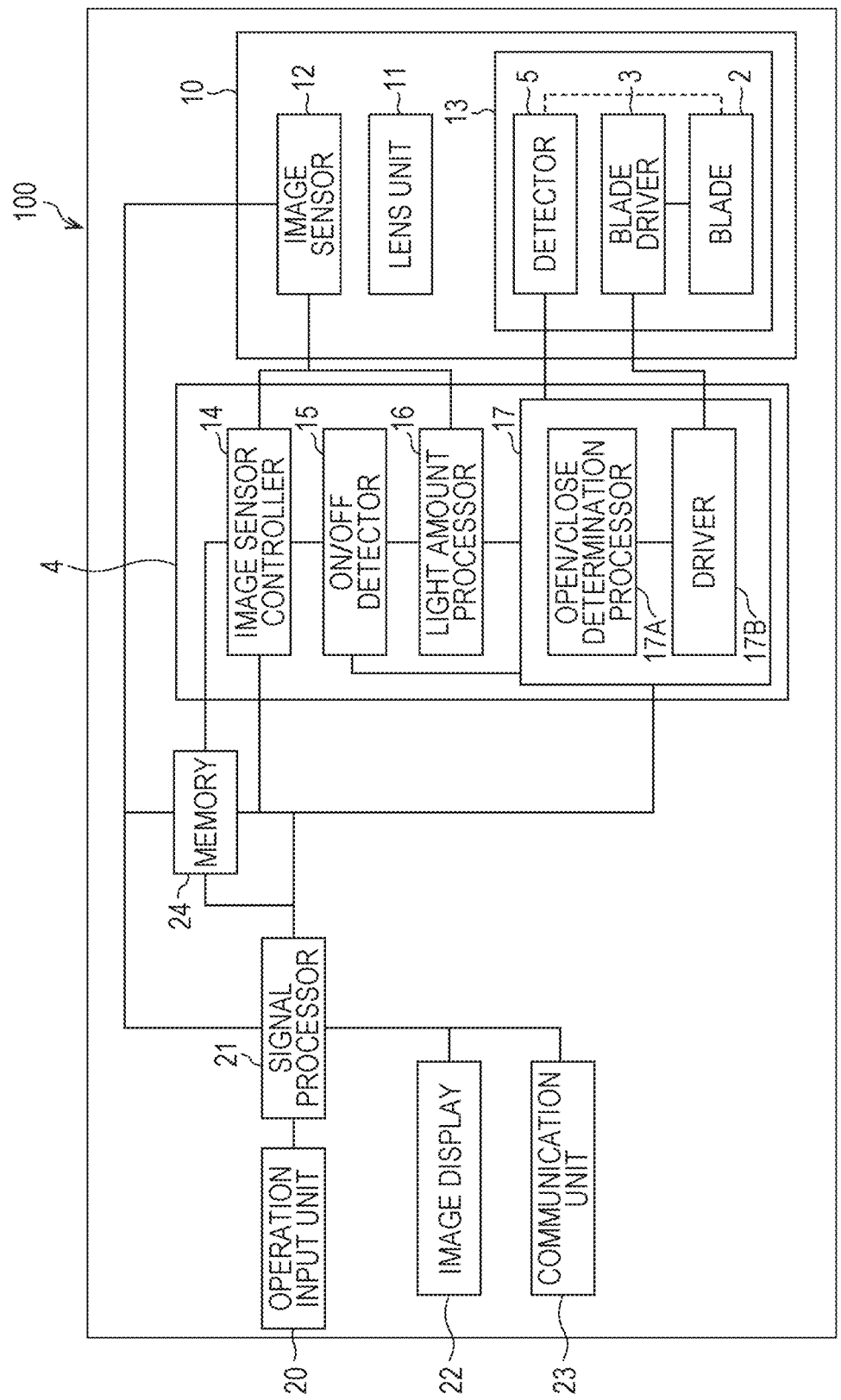
FIG. 4 is a block diagram of an example information communication terminal including the blade operating device.
Figure 5:
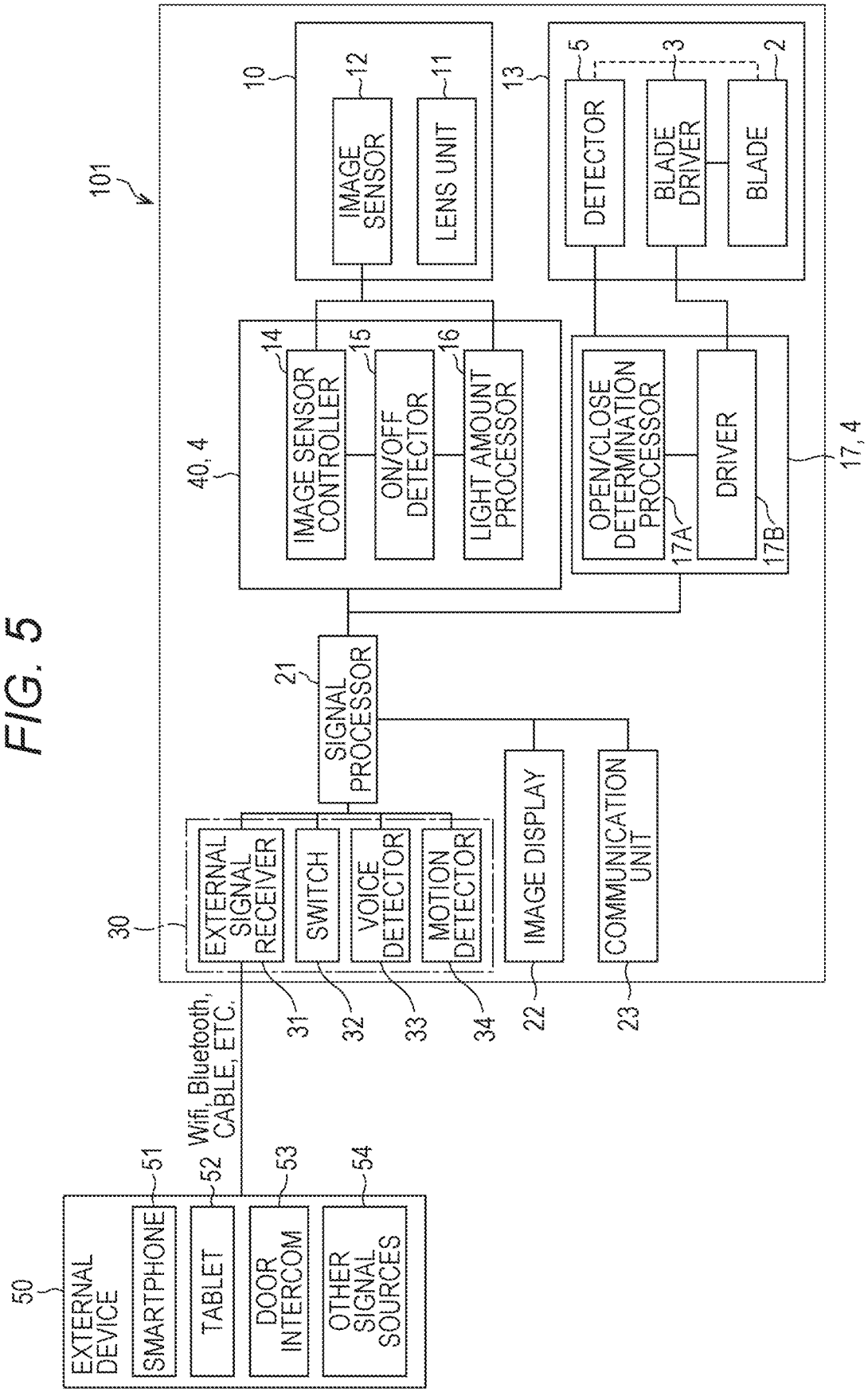
FIG. 5 is a block diagram of an example information communication terminal including the blade operating device.
Figure 6:
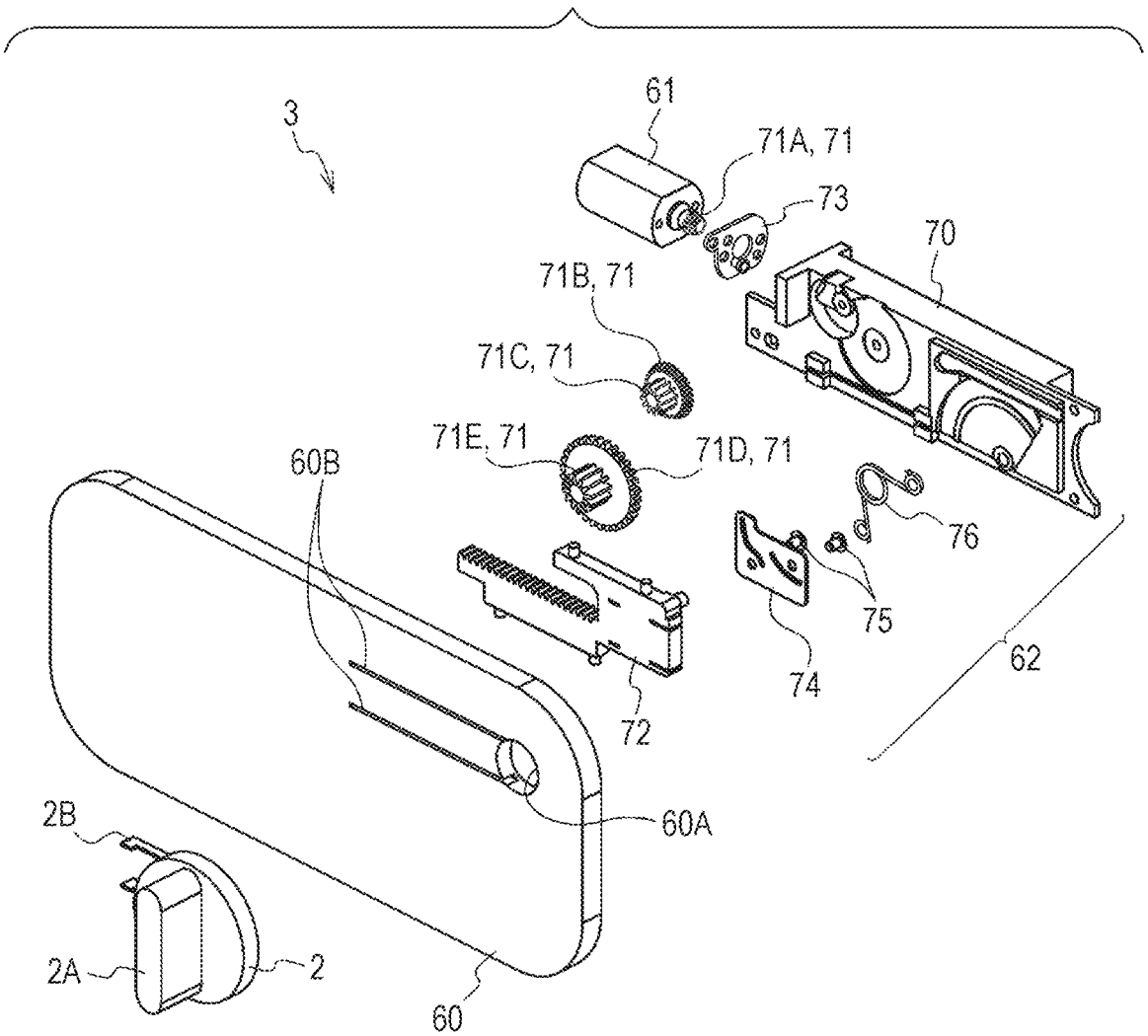
FIG. 6 is an exploded perspective view of a blade driver showing its example mechanical structure.
Figure 7A:
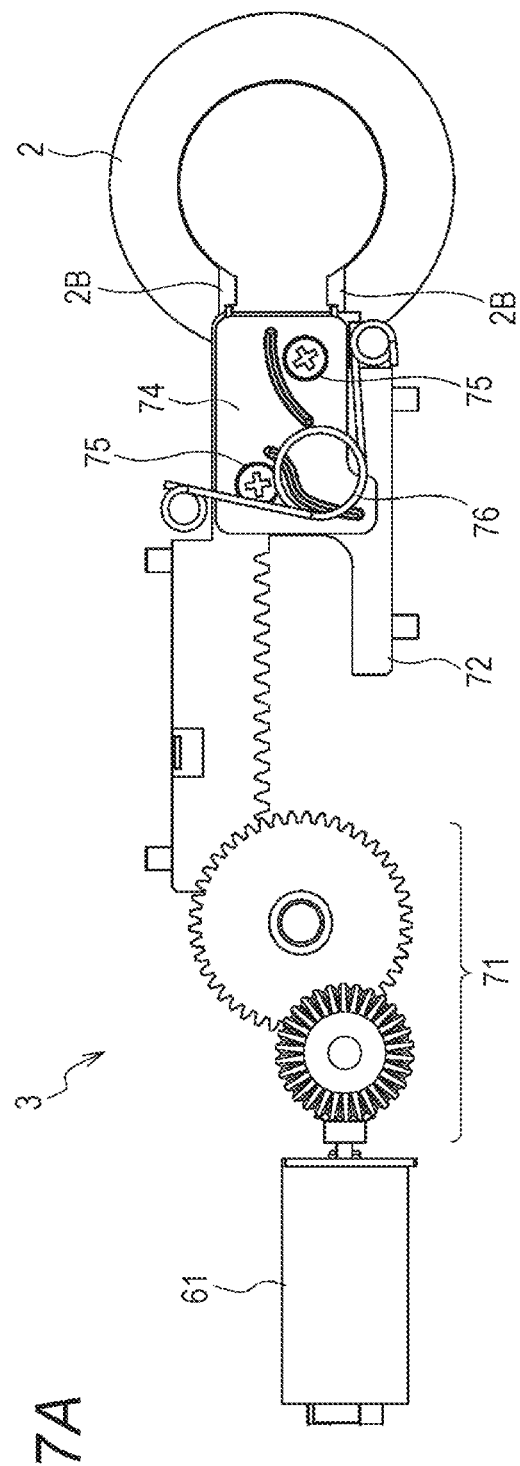
FIG. 7A is a side view of the blade driver.
Figure 7B:
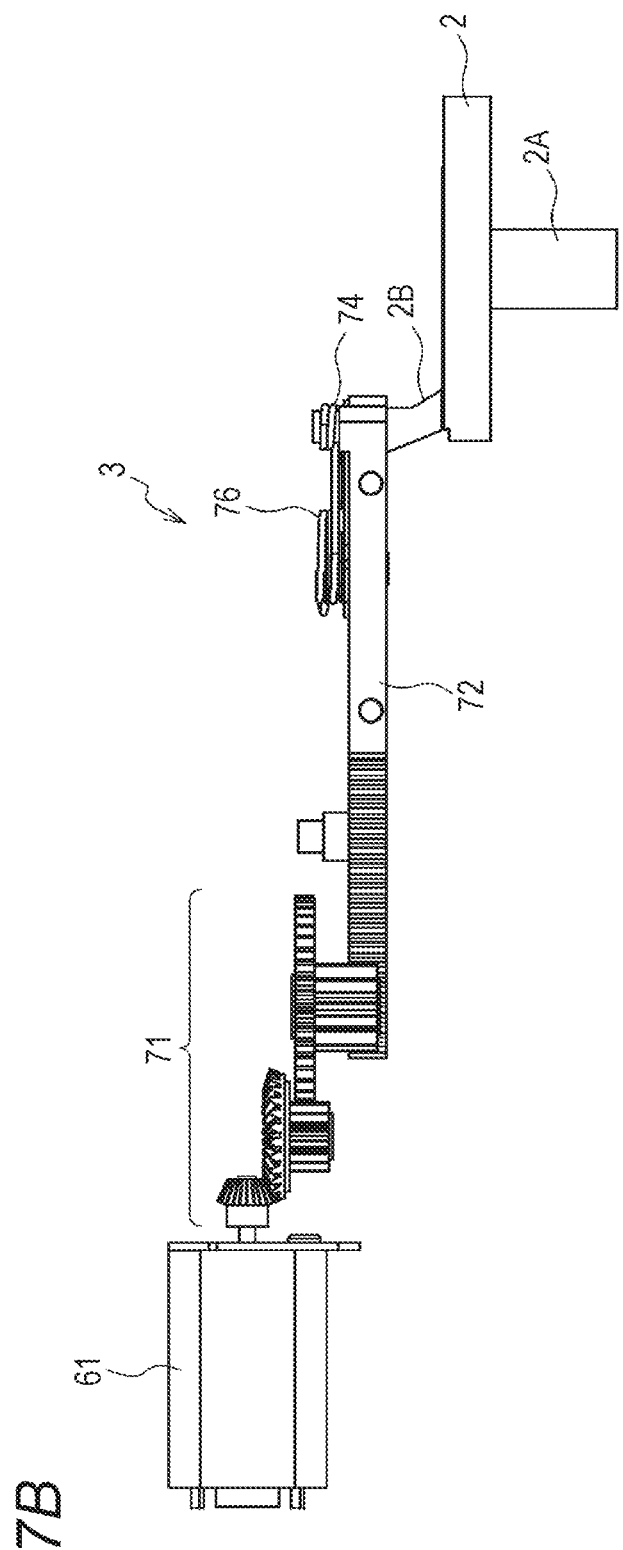
FIG. 7B is a plan view of the blade driver, each showing its example mechanical structure.
Figure 8A:
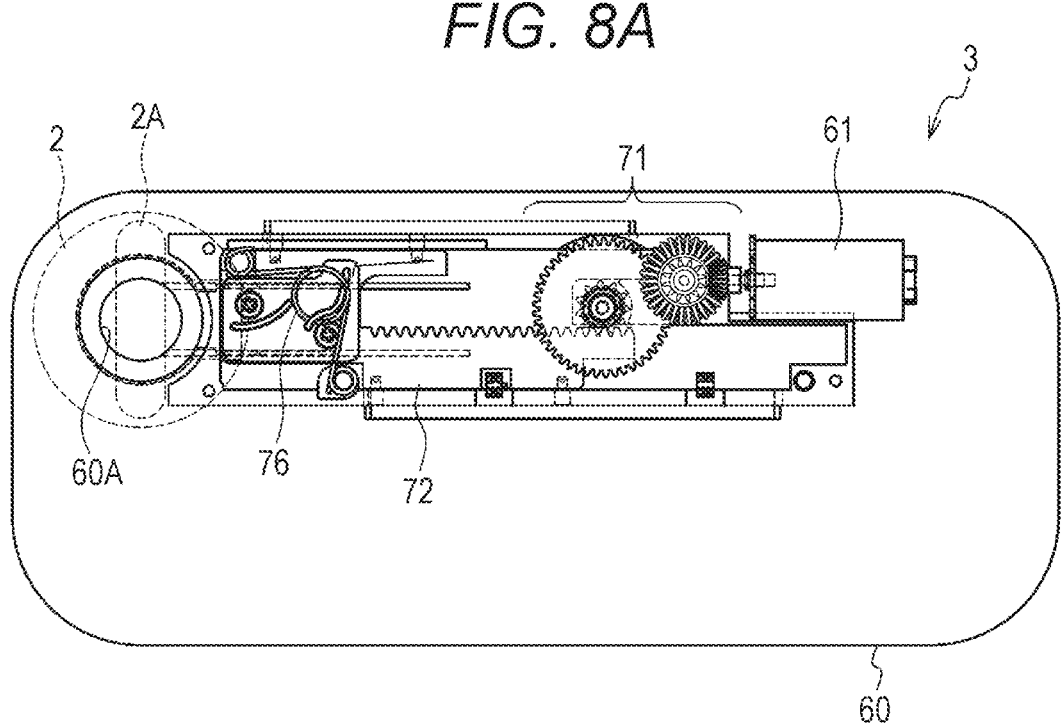
FIG. 8A is a diagram of the blade driver with the blade in a closed state.
Figure 8B:
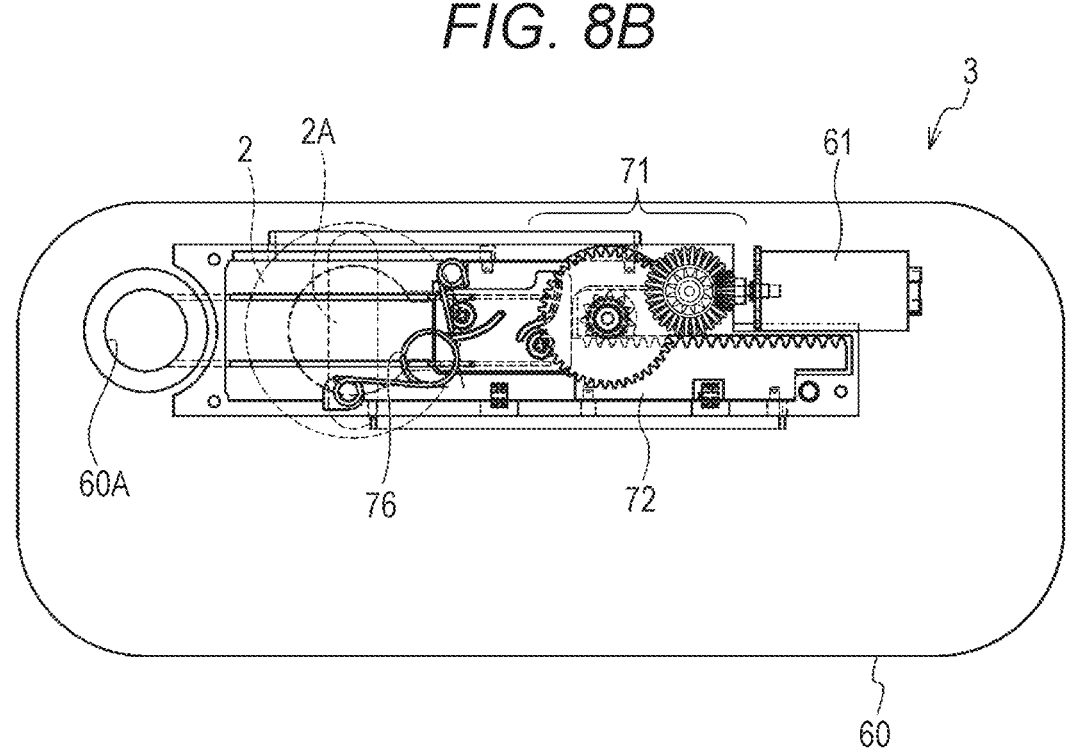
FIG. 8B is a diagram of the blade driver with the blade in an open state.

FIGS. 4 and 5 are block diagrams of example information communication terminals each including the blade operating device 1 described above. The information communication terminal 100 shown in FIG. 4 includes the imaging device 10 including the lens unit 11 and the image sensor 12. The imaging device 10 further includes a blade drive unit 13 including the blade 2, the blade driver 3, and a detector 5 for detecting an open or closed state of the blade 2.

The controller 4 in the information communication terminal 100 includes an image sensor controller 14, an on/off detector 15, a light amount processor 16, and a blade drive controller 17. The blade drive controller 17 includes an open/close determination processor 17A and a driver 17B.

The information communication terminal 100 further includes an operation input unit 20 including a switch or a touch panel, a signal processor 21 that processes signals, an image display 22 including, for example, a display, a communication unit 23 that connects to a network wirelessly or with wires, and a memory 24 that stores image information or other data.

Imaging with a camera in the information communication terminal 100 will be described. The user inputs an instruction associated with imaging with a camera to the information communication terminal 100 by touching or switching on the operation input unit 20. When receiving the user instruction for turning on the operation from the operation input unit 20, the signal processor 21 transmits a signal to the blade drive controller 17. The open/close determination processor 17A in the blade drive controller 17 determines an opening operation, and transmits an opening signal to the blade driver 3 through the driver 17B to open the blade 2.

When receiving the user instruction for turning on the operation, the signal processor 21 also transmits a signal to the image sensor controller 14. The image sensor controller 14 then transmits a control signal to the image sensor 12 to start operating. This allows the image sensor 12 to receive light through the lens unit 11, and image signals representing the images captured by the image sensor 12 to be stored into the memory 24 or transmitted to the image display 22 or the communication unit 23 through the signal processor 21.

The light amount processor 16 in the controller 4 determines whether the image sensor 12 receives light. When the image sensor 12 receives no light, a detection result from the on/off detector 15 in the image sensor 12 is checked. When determining that the image sensor 12 is in an on state, the controller 4 transmits a signal to the blade drive controller 17 to open the blade 2. When the light amount processor 16 determines that light is received, image signals from the image sensor 12 are transmitted to the memory 24, or to the image display 22 or the communication unit 23 through the signal processor 21.

When receiving the user instruction for turning off the operation from the operation input unit 20, the signal processor 21 transmits a signal to the blade drive controller 17. The open/close determination processor 17A in the blade drive controller 17 determines a closing operation, and transmits a closing signal to the blade driver 3 through the driver 17B to close the blade 2. When the signal processor 21 is cracked through the communication unit 23, the signal processor 21 may transmit a signal to the blade drive controller 17. In this case, the open/close determination processor 17A in the blade drive controller 17 does not determine an opening operation because the signal from the signal processor 21 is not based on a user instruction, and transmits no opening signal to the blade driver 3.

An information communication terminal 101 shown in FIG. 5 will be described. The components with the same function as those of the information communication terminal 100 shown in FIG. 4 are given the same reference numerals, and some components will not be described repeatedly. In the information communication terminal 101, the imaging device 10 and the blade drive unit 13 are separate from each other. The blade drive controller 17 and the imaging device controller 40 in the controller 4 are also separate from each other. A signal input unit 30 for receiving a user instruction includes, for example, an external signal receiver 31, a switching unit 32, a voice detector 33, and a motion detector 34. The external signal receiver 31 is connected to an external device 50 such as a smartphone 51, a tablet terminal 52, a door intercom 53, or other signal sources 54 through a communication medium such as Wili, Bluetooth (registered trademark), or a cable.

With the information communication terminal 101, the user can input an instruction by operating the external device 50. The user instruction is transmitted to the controller 4 through the communication medium. The user instruction can also be transmitted to the controller 4 through voice recognition of the voice detector 33, or through automatic detection of the motion detector 34.

FIGS. 6 to 8B show example mechanical structures of the blade driver 3. The blade driver 3 slides the blade 2 including a manual operation unit 2A relative to the base member 60 including a shooting hole 60A. The blade driver 3 includes a motor 61 that is driven in response to a signal from the controller 4 described above, and a slide mechanism 62 that slides as the motor 61 rotates and thus slides the blade 2. The blade 2 includes support arms 2B opposite to the manual operation unit 2A. The base member 60 includes guide slots 60B for slidably guiding the support arms 2B of the blade 2.

The slide mechanism 62 includes a gear support 70, a gear train 71 that is rotatable by the motor 61, and a slide gear member 72 that is slidable in mesh with a rotating gear in the gear train 71. The gear train 71 includes a first gear 71A (bevel gear) attached to a rotational shaft of the motor 61, a second gear 71B (bevel gear) meshing with the first gear 71A, a third gear 71C integrally rotatable with the second gear 71B, a fourth gear 71D meshing with the third gear 71C, and a fifth gear 71E integrally rotatable with the fourth gear 71D. The slide gear member 72 is meshed with the fifth gear 71E.

The motor 61 is attached to the gear support 70 with a bracket 73. The gear support 70 supports the gear train 71 and supports the slide gear member 72 in a slidable manner. The slide gear member 72 receives an end of a spring 76 through a spring attachment member 74. The gear support 70 supports the other end of the spring 76.

The support arms 2B of the blade 2 extend through the guide slots 60B and fixed to the slide gear member 72. The motor 61 rotates to rotate the gear train 71 to cause the slide gear member 72 meshed with the fifth gear 71E in the gear train 71 to slide along the guide slots 60B. The blade 2 fixed to the slide gear member 72 thus slides along the guide slots 60B. The blade 2 slides with the slide gear member 72 between a closed position at which the blade 2 closes the shooting hole 60A in the base member 60 and an open position at which the blade 2 opens the shooting hole 60A.

The slide gear member 72 is urged by the spring 76 in a direction of a closing operation of the blade 2 when the motor 61 is nonenergized. When the slide gear member 72 is slid away by a predetermined distance from the position of an end of the slide gear member 72 at which the blade 2 is closed, the slide gear member 72 is urged by the spring 76 in a direction of an opening operation of the blade 2.

The blade 2 can be manually slid between the open position and the closed position described above with the manual operation unit 2A being manually pushed along the guide slots 60B. The blade 2 can thus be open and closed automatically by the motor 61, and also manually. When open or closed either by the motor 61 or manually, the blade 2 is retained in an open state or in a closed state by the spring 76.

In the illustrated examples, the blade 2 is located outside the base member 60 and is thus externally viewable to determine whether the blade 2 is in an open state or in a closed state. The support arms 2B of the blade 2 extend through the guide slots 60B and are fixed to the slide gear member 72 inside the base member 60. This structure allows the user to visually check the shooting hole 60A to be closed when the imaging device 10 is not in use. When the blade 2 is incorporated in the imaging device 10, the blade 2 may be colored and thus may be externally viewable to determine whether the blade 2 is in an open state or in a closed state.

In this blade operating device 1, the blade 2 closes the optical path Op to block light incident on the image sensor 12 when the imaging device 10 connected to a network is not in use. The imaging device 10 thus captures no image unintended by the user if operated in an unauthorized manner. The blade 2 enters an open state in response to a user instruction. This prevents unauthorized capturing of images, and also prevents failures to capture intended images due to the blade 2 erroneously closing the optical path Op when the imaging device 10 is in use.

The blade driver 3 may have any structures other than the structures shown in FIGS. 6 to 8B. In another embodiment, for example, the gears may be replaced with lead screws. The base member 60 in the blade operating device 1 may be an external part of the imaging device 10 or the information communication terminal. In this case, the blade 2 may be exposed.

Although the embodiments of the present invention have been described in detail with reference to the drawings, the specific structures are not limited to the above embodiments. The present invention may be modified in design without departing from the spirit and scope of the present invention. Additionally, the techniques described in the above embodiments may be combined, unless any contradiction arises in their purposes and structures.

What is claimed is:

1. A blade operating device, comprising:
   a blade configured to open and close an optical path of an imaging device connectable to a network;
   a single spring configured to retain the blade in an open position and in a closed position;
   a blade driver configured to open and close the blade; and
   a controller configured to control the blade driver,
   wherein the controller controls the blade driver to close the blade when the imaging device is turned off,
   wherein the blade driver includes:
      a motor drivable in response to a signal from the controller, and
      a slide mechanism slidable to slide the blade in response to rotation of the motor, wherein the slide mechanism further includes:
         a gear train rotatable by the motor, and a slide gear member slidable in mesh with a rotating gear in the gear train, wherein
         the slide gear member is urged by the single spring in a direction of a closing operation of the blade when the motor is nonenergized, and the slide gear member is urged by the single spring in a direction of an opening operation of the blade when the slide gear member is slid away by a predetermined distance from a position of an end of the slide gear member at which the blade is closed; and a spring attachment member attached to the slide gear member, wherein a first end of the single spring is attached to the spring attachment member, and a gear support configured to support the gear train, wherein a second end of the single spring, opposite the first end, is attached to the gear support.

2. The blade operating device according to claim 1, wherein
the controller controls the blade driver to open the blade in response to a signal in accordance with an instruction from a user.

3. The blade operating device according to claim 2, wherein
the signal in accordance with the instruction from the user is transmitted to the controller through a communication medium.

4. The blade operating device according to claim 2, wherein
the signal in accordance with the instruction from the user is transmitted to the controller through voice recognition.

5. The blade operating device according to claim 2, wherein
the signal in accordance with the instruction from the user is transmitted to the controller through automatic detection.

6. The blade operating device according to claim 2, wherein
the signal in accordance with the instruction from the user is transmitted to the controller through an operation on an external device.

7. The blade operating device according to claim 1, wherein
the controller determines that the blade is closed based on an amount of light received by an image sensor.

8. The blade operating device according to claim 1, wherein
the blade driver retains the blade in an open state or in a closed state when nonenergized.

9. The blade operating device according to claim 1, wherein
the blade is externally viewable to determine whether the blade is in the open state or in the closed state.

10. The blade operating device according to claim 1, wherein
the blade driver allows opening and closing of the blade with a manual operation of the user.

11. An imaging device, comprising:
the blade operating device according to claim 1.

12. An information communication terminal, comprising:
the imaging device according to claim 11.

13. The blade operation device according to claim 1, wherein
the blade comprises a manual operating unit.

14. A blade operating method for opening and closing a blade for opening and closing an optical path of an imaging device connectable to a network, the method comprising:
closing the blade when the imaging device is turned off, wherein a single spring retains the blade in an open position and in a closed position, and closing the blade includes:
selectively rotating a motor, and
sliding a slide mechanism to slide the blade in response to rotation of the motor, wherein the slide mechanism further includes a gear train, supported by a gear support, rotatable by the motor, and a slide gear member slidable in mesh with a rotating gear in the gear train, wherein a first end of the single spring is attached to a spring attachment member which is attached to the slide gear member, and a second end of the single spring, opposite the first end, is attached to the gear support, wherein
urging, by the single spring, in a direction of a closing operation of the blade when the motor is nonenergized, and
urging, by the single spring, in a direction of an opening operation of the blade when the slide gear member is slid away by a predetermined distance from a position of an end of the slide gear member at which the blade is closed.

15. The blade operating method according to claim 14, further comprising:
opening the blade with a user operation of operating the imaging device.

16. The blade operating method according to claim 14, further comprising:
controlling a blade driver to open the blade in response to an instruction from the user.

17. The blade operating method according to claim 14, further comprising:
opening or closing the blade with a manual operation of the user.

* * * * *